US 9,777,606 B2

(12) United States Patent
Murai et al.

(10) Patent No.: US 9,777,606 B2
(45) Date of Patent: Oct. 3, 2017

(54) ENGINE SYSTEM

(71) Applicant: YANMAR CO., LTD., Osaka-shi (JP)

(72) Inventors: Susumu Murai, Osaka (JP); Akihiro Nagao, Osaka (JP); Hiroyuki Okada, Osaka (JP)

(73) Assignee: YANMAR CO., LTD., Osaka-Shi (JP)

(*) Notice: Subject to any disclaimer, the term of this patent is extended or adjusted under 35 U.S.C. 154(b) by 50 days.

(21) Appl. No.: 14/809,461

(22) Filed: Jul. 27, 2015

(65) Prior Publication Data
US 2016/0040565 A1    Feb. 11, 2016

(30) Foreign Application Priority Data

Aug. 5, 2014   (JP) ................... 2014-159295

(51) Int. Cl.
*F01M 11/00* (2006.01)
*F02B 73/00* (2006.01)
*F02B 63/04* (2006.01)
*F16N 31/00* (2006.01)

(52) U.S. Cl.
CPC ....... *F01M 11/0004* (2013.01); *F02B 63/044* (2013.01); *F02B 73/00* (2013.01); *F16N 31/006* (2013.01); *Y02E 20/14* (2013.01)

(58) Field of Classification Search
None
See application file for complete search history.

(56) References Cited

U.S. PATENT DOCUMENTS

| 8,960,708 | B2* | 2/2015 | Ziebert | F02B 63/044 |
| | | | | 123/2 |
| 2007/0296223 | A1* | 12/2007 | Saylor | F02B 63/04 |
| | | | | 290/1 R |
| 2010/0072757 | A1* | 3/2010 | Kealy | F01N 13/04 |
| | | | | 290/1 A |

FOREIGN PATENT DOCUMENTS

JP         4791950 B2    10/2011

* cited by examiner

*Primary Examiner* — Hieu T Vo
*Assistant Examiner* — Arnold Castro
(74) *Attorney, Agent, or Firm* — Locke Lord LLP; Howard M. Gitten

(57) ABSTRACT

In a cogeneration device, a space is formed on a base member that supports an engine and an electric power generator in order to store leakages from the engine in the space. A panel-fixing bracket is provided outside the storage space, at a predetermined distance from a vertical wall section forming a vertical wall of the storage space. A panel, which is a part of a package, is bolted and fixed to the bracket. This structure enables each panel to be fixed to the base member while preventing the leakages stored in the storage space from leaking out.

1 Claim, 5 Drawing Sheets

ENGINE SYSTEM

CROSS-REFERENCE TO RELATED APPLICATION (FOR U.S. APPLICATION ONLY)

The present application hereby claims priority under 35 U.S.C. §119 on Japanese Patent Application, Tokugan, No. 2014-159295 filed Aug. 5, 2014 in Japan, the entire contents of which are hereby incorporated herein by reference.

CROSS REFERENCE TO RELATED APPLICATIONS

This application is related to co-pending application: "ENGINE SYSTEM" filed even date herewith in the names of Tomoyuki Ikeda, Satoshi Abe, and Yosuke Tahara, which claims priority to Japanese Application No. 2014-159293, filed Aug. 5, 2014; "ENGINE SYSTEM" filed even date herewith in the names of Tomoyuki Ikeda, Satoshi Abe, and Yosuke Tahara, which claims priority to Japanese Application No. 2014-159294, filed Aug. 5, 2014; and "ENGINE SYSTEM" filed even date herewith in the names of Susumu Murai, Akihiro Nagao and Hiroyuki Okada, which claims priority to Japanese Application No. 2014-159296, filed Aug. 5, 2014; which applications are assigned to the assignee of the present application and all three incorporated by reference herein.

BACKGROUND OF INVENTION

Technical Field of Invention

The present invention relates in general to engine systems and in particular to a modification of a base member that stores leakages from an engine.

Related Technology

Conventional engine systems are known that include an engine and a work machine (e.g., electric power generator) provided on a base member. An example of such an engine system includes, on the base member, a storage section that recovers and stores leakages (e.g., leaking engine oil) from the engine (see, for example, Patent Document 1 (Japanese Patent No. 4791950)).

A typical engine system contains an engine and a work machine in a single package. In other words, an engine and a work machine are enclosed by external face panels of a package.

SUMMARY OF INVENTION

Patent Document 1, however, discloses nothing about how the engine and the work machine should be enclosed by external face panels when there is provided a storage section on a base member, failing to disclosing a structure that fixes the external face panels while preventing the leakages stored in the storage section from leaking out.

In view of these issues, it is an object of the present invention to provide an engine system capable of fixing external face panels and at the same time preventing leakages stored in a storage section on a base member from leaking out.

The present invention is an engine system containing an engine and a work machine in a single package. The engine system includes a base member that has a box-shaped portion with an open top, the base member being provided below an oil pan for the engine. The box-shaped portion has outside thereof a fixing bracket to fix an external face panel of the package.

In the present invention, the box-shaped portion on the base member serves to recover and store leakages from the engine. In addition, the fixing bracket, provided outside the box-shaped portion, serves to fix an external face panel of the package. Therefore, even if the fixing bracket has a bolt hole or like opening to fix the external face panel, the opening is not open to the internal space of the box-shaped portion (leakage-storing space). Hence, the external face panel is fixed to the base member in such a manner that the leakages stored in the box-shaped portion do not leak out.

DESCRIPTION OF EMBODIMENTS

The following will describe embodiments of the present invention in reference to drawings.

The present embodiment is an application of an engine system in accordance with the present invention to a cogeneration device 1. The cogeneration device 1 is a system that connects both an external commercial power supply from a commercial electric power system and an electric power supply from an electric power generator to an electric power supply system for an electric power consuming device (load), to meet the demand for electric power by the load and that also recovers waste heat generated in power generation for later use.

Figure 1:
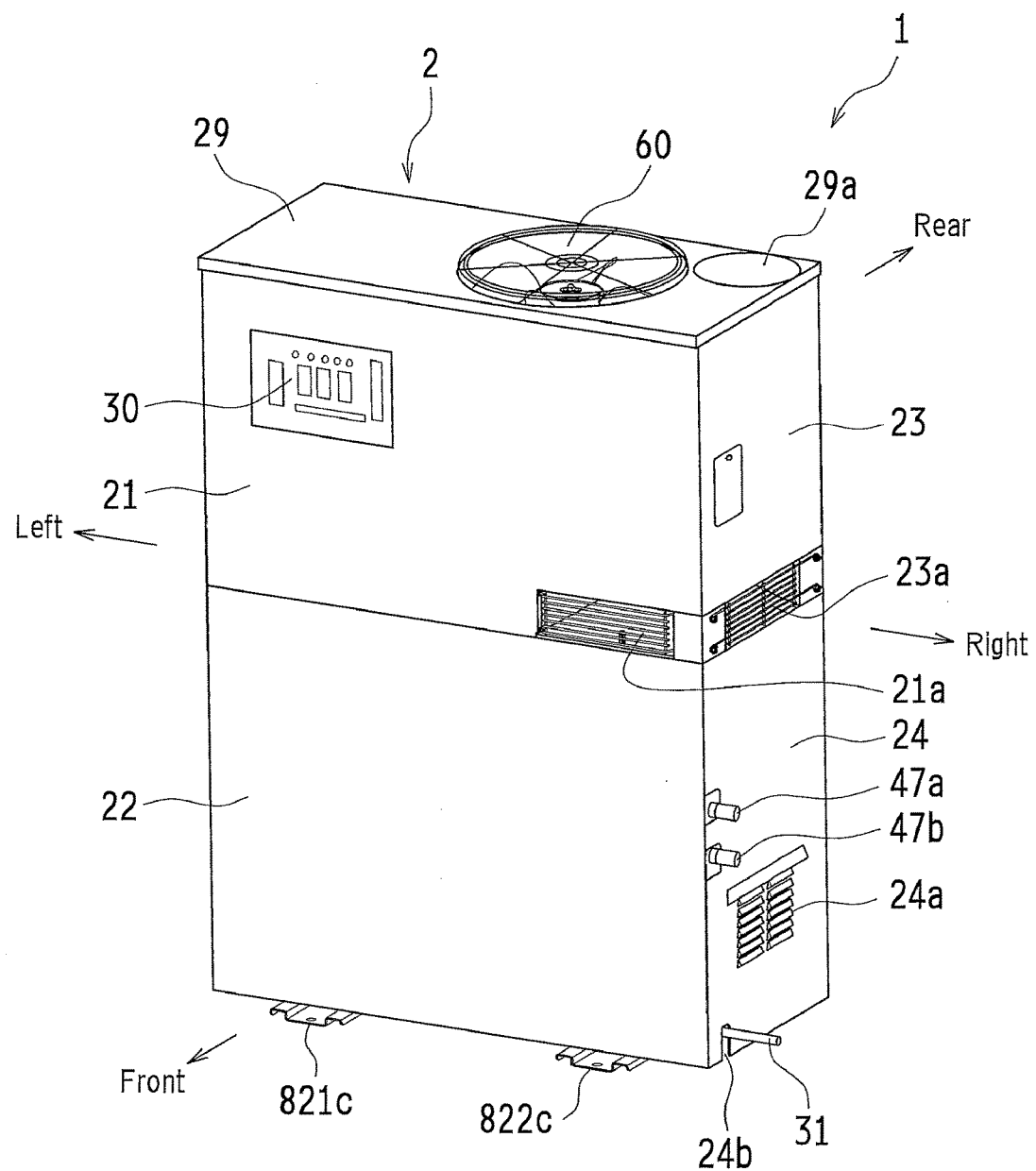
FIG. 1 is an oblique view of a cogeneration device in accordance with an embodiment of the present invention as viewed from the front.
Figure 2:
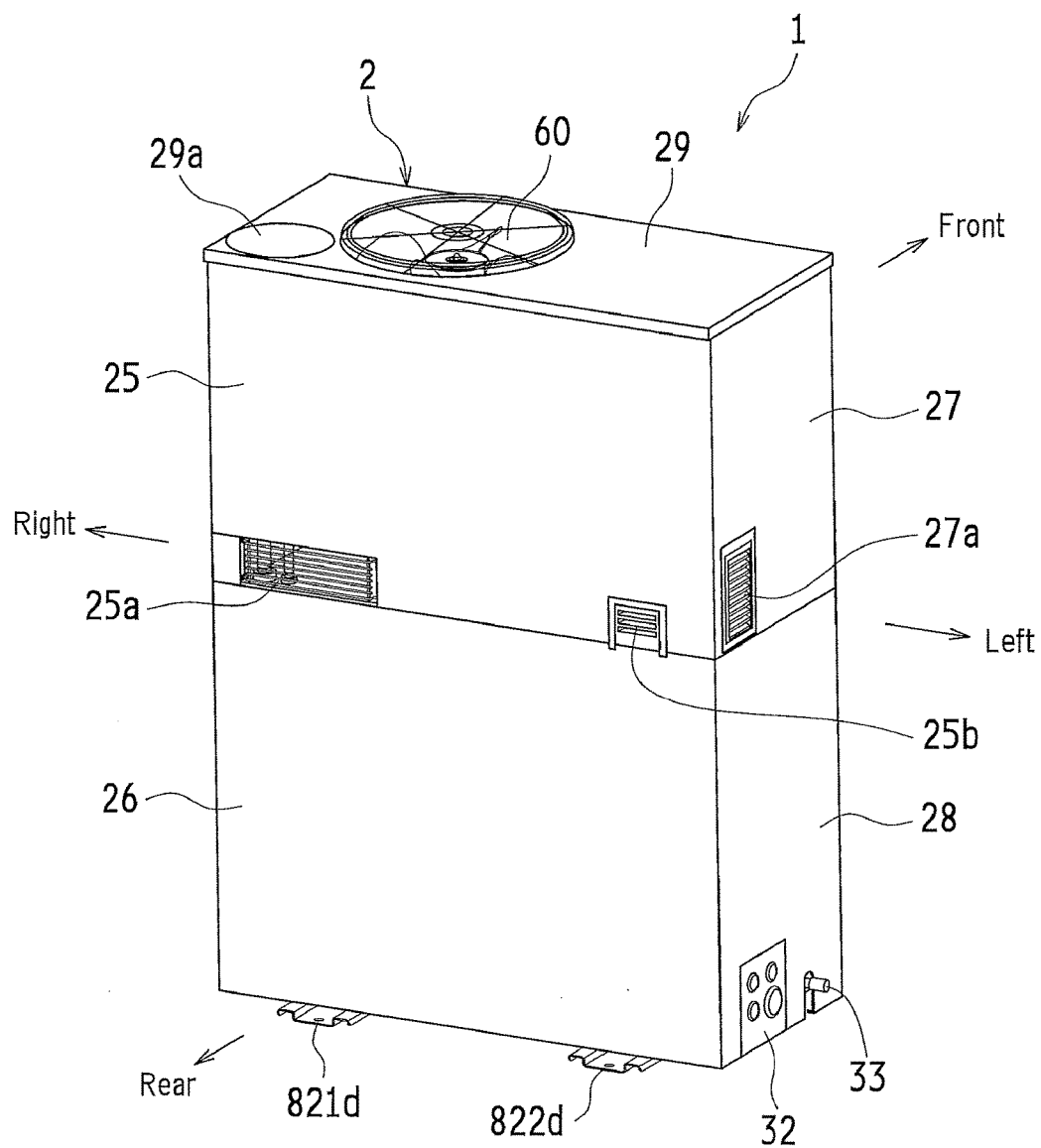
FIG. 2 is an oblique view of the cogeneration device shown in FIG. 1 as viewed from the rear.

FIGS. 1 and 2 are oblique views of the cogeneration device 1 as viewed from the front and rear respectively. As shown in FIGS. 1 and 2, the cogeneration device 1 in accordance with the present embodiment includes a package 2 as an enclosure shaped substantially like a vertically elongated rectangular parallelepiped. The package 2, in this example, has a greater dimension in the left/right direction (width) than in the front/rear direction (depth). Throughout the rest of the description, the left-hand side in FIG. 1 will be simply referred to as the left-hand side, and the right-hand side in FIG. 1 will likewise be simply referred to as the right-hand side.

More specifically, the package 2 in accordance with the present embodiment includes a frame 20 (see FIG. 3) and a plurality of panels (external face panels) 21 to 29. The frame 20 is composed of a steel-based material and has a rectangular base member 8 (see FIG. 3) as a base component. The panels 21 to 29 are attached to the frame 20 in such a manner that the panels 21 to 29 are individually detachable. In other words, as shown in FIG. 1, the front face of the package 2 is divided into two (i.e., upper and lower) panels 21 and 22. The right face of the package 2 is also divided into two (i.e., upper and lower) panels 23 and 24.

Likewise, as shown in FIG. 2, the rear face of the package 2 is also divided into two (i.e., upper and lower) panels 25 and 26. The left face of the package 2 is also divided into two (i.e., upper and lower) panels 27 and 28. Meanwhile, the top face of the package 2 is a single-piece top face panel 29 in which there are provided, for example, a radiator fan 60 and an engine exhaust port 29a (detailed later).

A control panel 30 is provided near the upper left corner of the upper panel 21 on the package's front face. A radiator vent 21a is provided in a right bottom part of the upper panel 21. Another radiator vent 23a is provided in a bottom part of the upper panel 23 on the package's right face. An engine ventilation gallery 24a is provided in a lower part of the lower panel 24 on the package's right face. A notch section 24b is cut out on the bottom end of the lower panel 24, close to the front. A drain hose 31 is run through the notch section 24b.

Near the right bottom corner of the upper panel 25 on the package's rear face, opposite the radiator vent 21a in the upper panel 21 on the package's front face, is there provided a like radiator vent 25a. Near the left bottom corner of the upper panel 25 is there provided an engine air intake gallery 25b. A gallery (vent) 27a is provided in a bottom part of the upper panel 27 on the package's left face, close to the rear, to introduce an inverter-cooling air flow. A power supply connector 32 and a gas supply tap 33 are provided in a bottom part of the lower panel 28 on the package's left face.

Figure 3:
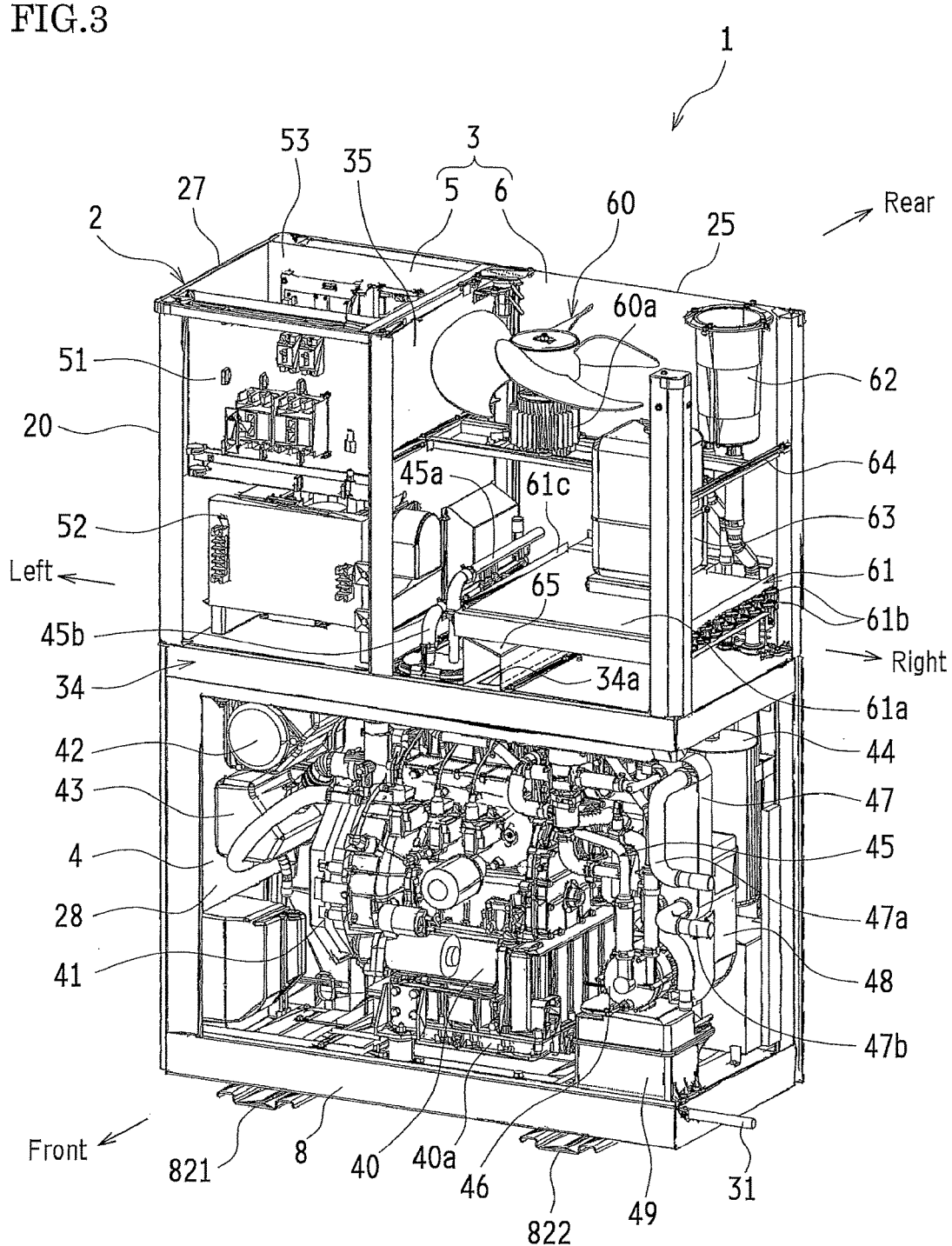
FIG. 3 is an oblique view of the cogeneration device shown in FIG. 1, illustrating the structure of the cogeneration device by removing parts of its package.

As illustrated in FIG. 3 by partially omitting the panels 21 to 29, the frame 20, and some other structural members, the internal space of the package 2 is divided into two upper and lower portions by a midlevel wall 34 located substantially halfway up from the bottom. The upper portion contains a top compartment 3, whereas the lower portion contains a bottom compartment 4. The top compartment 3 is divided by a partition wall 35 into left and right portions. The left portion contains a device installation chamber 5, whereas the right portion contains a radiator chamber 6.

An engine 40 and an electric power generator (work machine) 41 that is powered by the engine 40 are disposed substantially at the center of the bottom compartment 4. In the left-hand side of the bottom compartment 4 are there provided an air cleaner 42, an intake air silencer 43, and other air intake system components for the engine 40. Meanwhile, an exhaust system is disposed on the rear of the engine 40. An exhaust silencer 44, connected to an exhaust manifold (not shown), is disposed in the right-hand side of the bottom compartment 4, close to the rear. As an example, the engine 40 may be a gas engine.

A cooling water circuit 45 is disposed in the right-hand side of the bottom compartment 4, close to the front, so as to cool the engine 40 during operation and recover waste heat. The cooling water circuit 45 connects a water jacket of the engine 40 to a radiator 61 (detailed later) to circulate cooling water by a cooling water pump 46 and recover exhaust heat by an exhaust gas heat exchanger (not shown).

The waste heat thus recovered may be reused by a water/water heat exchanger 47 as a heat source for a water heater or like system that is out of the view. The water/water heat exchanger 47 is connected to the cooling water circuit 45. More specifically, a water supply tube 47a and a waste water tube 47b, both connected to the water/water heat exchanger 47, extend through the lower panel 24 on the package's right face and project out of the package 2 as illustrated in FIG. 1, so that piping from, for example, a water heater can be connected to the water supply tube 47a and the waste water tube 47b.

An air intake fan 48 is disposed so as to be interposed between the cooling water circuit 45 and the exhaust silencer 44, to draw outside air into the bottom compartment 4 for ventilation. The air intake fan 48 operates in synchronism with the cooling water pump 46. The air intake fan 48 draws outside air through the gallery 24a in the lower panel 24 on the package's right face and through an air intake duct (not shown) and blows out the air at the bottom of the bottom compartment 4.

A drain water filter 49 is disposed in the right-hand side of the bottom compartment 4, close to its front lower part, below the cooling water circuit 45 and the cooling water pump 46. The drain water filter 49 recovers condensed water separated out of the exhaust of the engine 40 in a mist separator 62 (detailed later) and neutralizes its acidic content by calcite. The neutralized drain water is discharged from the package through the drain hose 31.

While the lower portion of the package 2 contains the bottom compartment 4 alone as mentioned above, the top compartment 3, located above the midlevel wall 34, is divided into the device installation chamber 5 and the radiator chamber 6 as mentioned above. The left one of the chambers, or the device installation chamber 5, contains electric components to control the engine 40 and the electric power generator 41. Circuit boards 51 to 53 shown, for example, in FIG. 3 carry thereon a control circuit for the engine 40, a control circuit for an electromagnetic valve and other components of the cooling water circuit 45, and a control circuit for, among others, the cooling water pump 46, the radiator fan 60, and the air intake fan 48 respectively.

Referring to FIG. 3, the radiator chamber 6, located to the right of the device installation chamber 5, contains the radiator fan 60 in its top portion, i.e., through the top face panel 29 of the package 2. The radiator 61, being rectangular in a plan view, is disposed laterally (in this example, substantially horizontally) facing the radiator fan 60 from below. The radiator fan 60 is located a little off the center (to the left) of the radiator chamber 6. To the right of the radiator fan 60 are there provided the mist separator 62 and a cooling water reserve tank 63. The mist separator 62 separates water content out of the exhaust of the engine 40.

The radiator fan 60 has a main body portion 60a containing an electric motor. The main body portion 60a is supported by the frame 20 of the package 2 via a subframe 64 so that the radiator fan 60 has its rotating shaft oriented vertically. The radiator 61, disposed to face the radiator fan 60 from below, is located off the center (to the right) of the radiator chamber 6, so that the middle portion of the core 61a of the radiator 61 is displaced to the right with respect to the rotating shaft line of the radiator fan 60.

A water supply pipe 45a and a waste water pipe 45b, which are components of the cooling water circuit 45, are disposed to the left of the radiator 61 located in the right-hand side of the radiator chamber 6 and are connected to respective tubes 61b of the radiator 61. Each tube 61b is folded over in the left/right direction inside the core 61a of the radiator 61 and has an end thereof connected to the water supply pipe 45a and the other end thereof connected to the waste water pipe 45b.

Heated cooling water flows into the tubes 61b via the water supply pipe 45a, and while passing through the tubes 61b in the core 61a of the radiator 61, exchanges heat with the air passing vertically through the core 61a (radiator ventilation air) to discharge heat. The cooling water, now cooled down as a result of the heat discharge, flows out of the tubes 61b into the waste water pipe 45b and returns to the water jacket of the engine 40 through the cooling water circuit 45.

The radiator 61 is separated from the underlying midlevel wall 34 by as much as the height of the radiator vents 21a, 23a, and 25a opened respectively in the front, right, and rear faces of the package 2, in order to allow the passage of the radiator ventilation air. This structure introduces outside air via the three radiator vents 21a, 23a, and 25a into an outside air introducing space formed below the radiator 61 and subsequently passes the outside air through the core 61a upward from below.

To support the radiator 61 above the midlevel wall 34 at a distance equal to the height of the radiator vents 21a, 23a, and 25a in this manner, the radiator 61 has a right frame portion thereof supported at its two front and rear corners by the frame 20 of the package 2. Meanwhile, the left frame portion 61c of the radiator 61 is supported by a spatial connection port cover 65 that covers a spatial connection port 34a in the midlevel wall 34 from above.

More specifically, the spatial connection port 34a is opened substantially through the central portion of the midlevel wall 34 with respect to the left/right direction (in this example, a little to the right of the central portion), so that the opening is formed vertically through the midlevel wall 34, spatially connecting the bottom compartment 4 to the radiator chamber 6. The spatial connection port cover 65 is disposed so as to cover the spatial connection port 34a from above. The spatial connection port cover 65 is open to the space that is to the left of the radiator chamber 6. The spatial connection port cover 65 restrains the ingress of rain water into the spatial connection port 34a and also guides the engine ventilation air that flows in from the bottom compartment 4 through the spatial connection port 34a to the space that is to the left of the radiator chamber 6.

Structure of Base Member

Next, the structure of the base member 8, a feature of the present embodiment, will be described.

Figure 4:
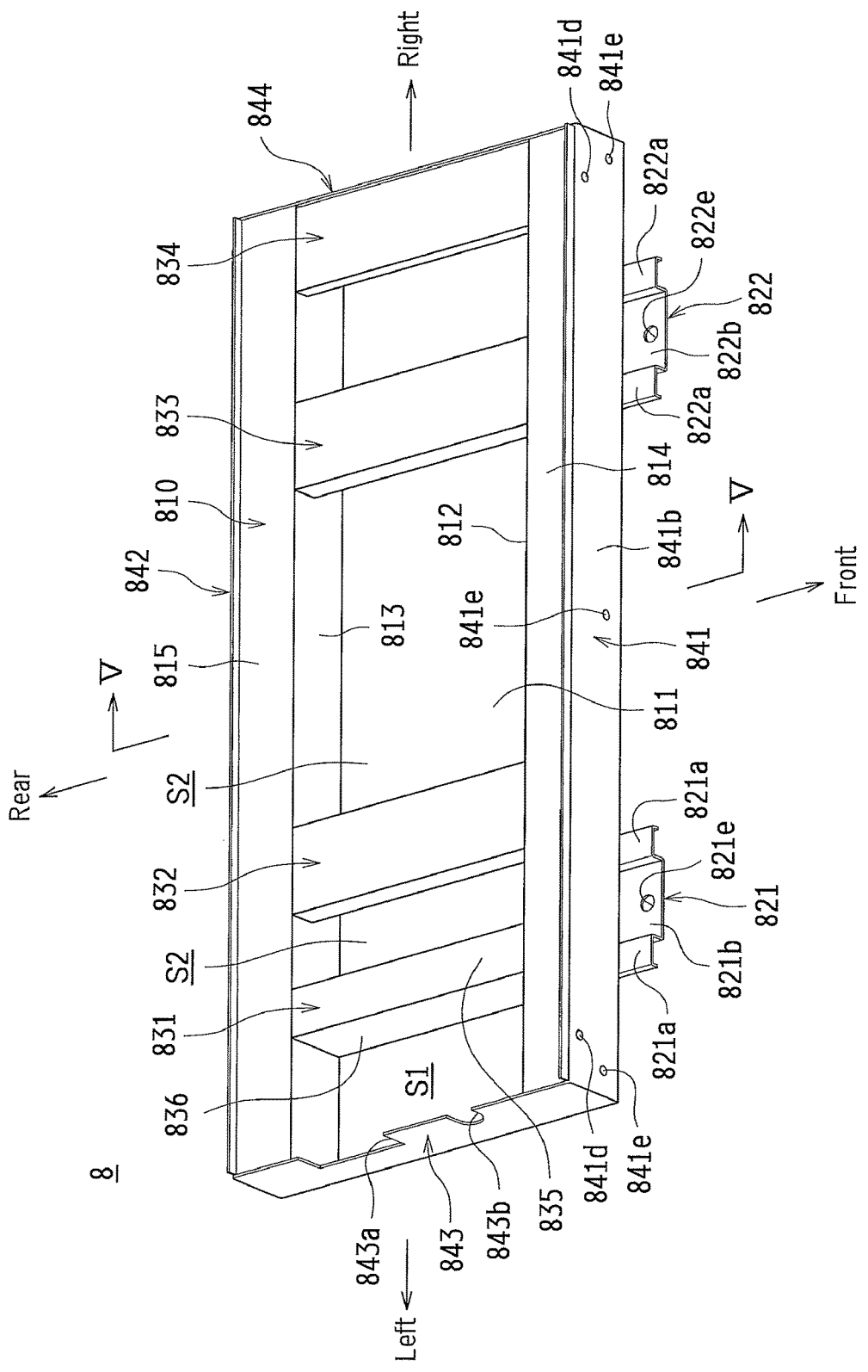
FIG. 4 is an oblique view of a base member.
Figure 5:
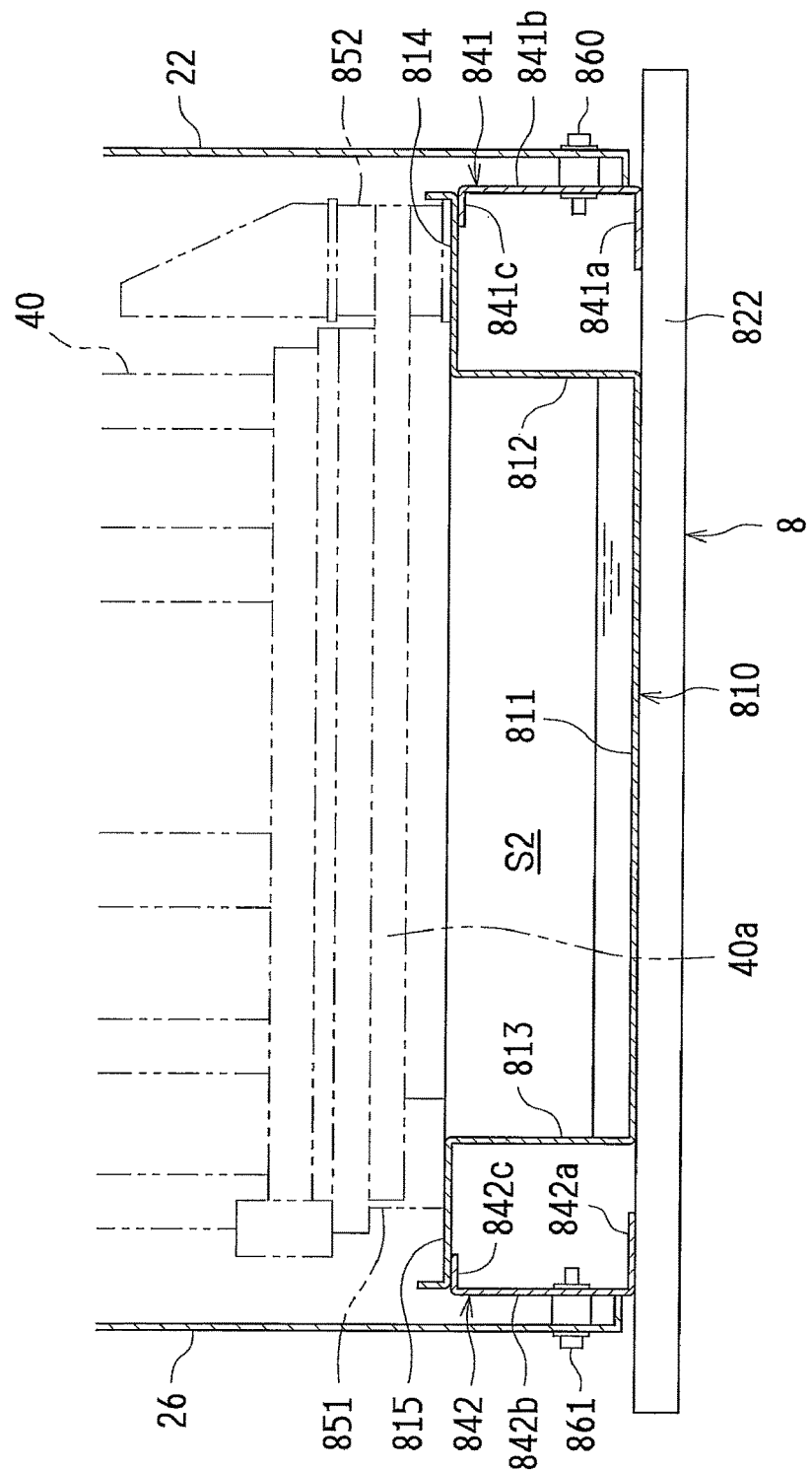
FIG. 5 is a cross-sectional view of the base member taken along line V-V indicated in FIG. 4, illustrating panels being fixed to the base member.

FIG. 4 is an oblique view of the base member 8 as viewed obliquely downward from the front. FIG. 5 is a cross-sectional view of the base member 8 taken along line V-V indicated in FIG. 4, illustrating the front lower panel 22 and the rear lower panel 26 being fixed to the base member 8. FIG. 5 also illustrates that a leakage storage space contains oil (detailed later).

As shown in these figures, the base member 8 includes a base member main body 810, two anchor plates 821 and 822, four support plates 831 to 834, and four fixing brackets 841 to 844. The following will describe these members individually.

Base Member Main Body

The base member main body 810 is located below an oil pan (sump) 40a (see FIGS. 3 and 5) for the engine 40 and has a bottom plate section 811, vertical wall sections 812 and 813, and horizontal sections 814 and 815.

The bottom plate section 811 is made of a flat plate and sits horizontally. The bottom plate section 811 has a left/right dimension that substantially matches the left/right dimension of the top face panel 29. The bottom plate section 811 has a front/rear dimension that is slightly shorter than the front/rear dimension of the top face panel 29.

The vertical wall sections 812 and 813 rise from the respective front and rear sides of the bottom plate section 811. The height of the vertical wall sections 812 and 813 is specified considering that the vertical wall sections 812 and 813 form between them a leakage storage space in which engine oil and other materials leaking from the engine 40 are stored as will be described later, so that the storage space can take up a sufficient amount of leakages (liquid storage level).

The horizontal sections 814 and 815 extend horizontally in the front/rear direction from the respective top edges of the vertical wall sections 812 and 813. In other words, the horizontal section 814, contiguous to the top edge of the front vertical wall section 812, extends horizontally from the top edge of the front vertical wall section 812 toward the front. The horizontal section 815, contiguous to the top edge of the rear vertical wall section 813, extends horizontally from the top edge of the rear vertical wall section 813 toward the rear. The front horizontal section 814 has a front edge thereof slightly curved upward. Likewise, the rear horizontal section 815 has a rear edge thereof slightly curved upward. This structure is intended to prevent leakages from the engine 40 from flowing out of the storage space even when the leakages fall dropwise onto the top faces of the horizontal sections 814 and 815.

The horizontal sections 814 and 815 have respective engine mounts 851 and 852 fixed thereto as indicated by virtual lines in FIG. 5. The engine mounts 851 and 852 resiliently support the engine 40.

Anchor Plate

The anchor plates 821 and 822 are separated from each other in the left/right direction by a predetermined distance and individually welded to the bottom face of the bottom plate section 811 of the base member main body 810.

Specifically, the anchor plate 821 (822) has a left/right pair of contact sections 821a (822a) and an anchor section 821b (822b). The contact sections 821a and 822a are welded to the bottom face of the bottom plate section 811 of the base member main body 810. The anchor section 821b (822b) is located below the bottom plate section 811 of the base member main body 810 between the pair of contact sections 821a (822a).

The anchor plates 821 and 822 each have a front/rear dimension specified longer than the front/rear dimension of the base member main body 810. This structure provides, at the front ends of the anchor plates 821 and 822, respective frontal extensions 821c and 822c that jut out of the front edge of the base member main body 810 toward the front (see FIG. 1). Likewise, the structure provides, at the rear ends of the anchor plates 821 and 822, respective rear extensions 821d and 822d that jut out of the rear edge of the base member main body 810 toward the rear (see FIG. 2). The anchor sections 821b and 822b have anchor holes 821e and 822e formed vertically through the frontal extensions 821c and 822c and the rear extensions 821d and 822d respectively (see FIG. 4). Anchor bolts (not shown) are inserted into the anchor holes 821e and 822e and fastened to a floor (not shown) in order to fix the cogeneration device 1 to the floor.

Support Plate

The support plates 831 to 834 link the vertical wall sections 812 and 813 of the base member main body 810. This structure increases the rigidity of the base member 8. Referring to FIG. 4, the support plates 831 to 834 are disposed in the order of, from left to right, the first support plate 831, the second support plate 832, the third support plate 833, and the fourth support plate 834. The front end of each support plate 831 to 834 is welded to the front vertical wall section 812. The rear end of each support plate 831 to 834 is welded to the rear vertical wall section 813.

The first support plate 831 has a horizontal section 835 and a vertical section 836 that extends downward from the left-hand side of the horizontal section 835. The bottom side of the vertical section 836 of the first support plate 831 is welded, along its entire front/rear length, to the top face of the bottom plate section 811 of the base member main body 810. The front and rear ends of the vertical section 836 of the first support plate 831 are also welded, along their entire vertical lengths, to the vertical wall sections 812 and 813. This structure divides the space (with an open top) formed by the bottom plate section 811 and the vertical wall sections 812 and 813 of the base member main body 810 into the left and right subspaces by the vertical section 836 of the first support plate 831. The left one of the subspaces (left subspace S1) is used to accommodate gas piping that leads to the gas supply tap 33. The right one of the subspaces (right subspace S2) is used as a storage space to store engine oil, cooling water, and other leakages that are recovered after falling dropwise from the engine 40.

The other support plates 832 to 834 are made of C-shape steel with an open bottom. The support plates 832 to 834 have a height specified shorter than the height of the vertical wall sections 812 and 813. The support plates 832 to 834 are disposed so that their bottom edges are separated from the bottom plate section 811 of the base member main body 810 by a predetermined distance. The space below the support plates 832 to 834 is also used as the storage space S2.

Fixing Bracket

The fixing brackets 841 to 844 consist of first to fourth brackets 841 to 844. The first bracket 841 serves to fix the front lower panel 22. The second bracket 842 serves to fix the rear lower panel 26. The third bracket 843 serves to fix the left lower panel 28. The fourth bracket 844 serves to fix the right lower panel 24.

Referring to FIG. 4, the first bracket 841 has a left/right dimension that substantially matches the left/right dimension of the base member main body 810.

Referring to FIG. 5, the first bracket 841 has a first horizontal section 841a, a vertical section 841b, and a second horizontal section 841c.

The first horizontal section 841a is welded to the top faces of the contact sections 821a and 822a at the frontal extensions 821c and 822c of the anchor plates 821 and 822.

The vertical section 841b extends upward from the front edge of the first horizontal section 841a. The vertical section 841b has a vertical dimension that substantially matches the height of the vertical wall section 812 of the base member main body 810. The vertical section 841b is disposed closer to the front by a predetermined distance than is the front vertical wall section 812. In other words, a predetermined distance is provided between the vertical section 841b of the first bracket 841 and the front vertical wall section 812. Specifically, the predetermined distance is specified longer than the length of bolts 860 (detailed later) that are used to fix the front lower panel 22 to the first bracket 841.

The second horizontal section 841c extends horizontally from the top edge of the vertical section 841b toward the rear and welded to the bottom face of the horizontal section 814 of the base member main body 810.

Referring to FIG. 4, the vertical section 841b of the first bracket 841 has formed horizontally therethrough bolt inserting holes 841d and 841e. In the present embodiment, two bolt inserting holes 841d in which the frame 20 is bolted and three bolt inserting holes 841e in which the front lower panel 22 is bolted are formed through the vertical section 841b.

The front lower panel 22 has similar bolt inserting holes that correspond to the bolt inserting holes 841e. With the bolt inserting holes in the lower panel 22 being aligned to the bolt inserting holes 841e in the vertical section 841b, the bolts 860 are inserted through the bolt inserting holes (see FIG. 5). This structure fixes the bottom end of lower panel 22 to the base member 8. Meanwhile, the top edge of the lower panel 22 is bolted to the midlevel wall 34. The lower panel 22 hence covers the front of the engine 40 and the electric power generator 41.

The second bracket 842 is formed symmetric to the first bracket 841. Specifically, the second bracket 842 has a first horizontal section 842a, a vertical section 842b, and a second horizontal section 842c, similarly to the first bracket 841.

The first horizontal section 842a is welded to the top faces of the contact sections 821a and 822a at the rear extensions 821d and 822d of the anchor plates 821 and 822.

The vertical section 842b is disposed closer to the rear by a predetermined distance than is the rear vertical wall section 813. In other words, a predetermined distance is provided between the vertical section 842b of the second bracket 842 and the rear vertical wall section 813. This predetermined distance is also specified longer than the length of bolts 861 (detailed later) that are used to fix the rear lower panel 26 to the second bracket 842.

The second horizontal section 842c is welded to the bottom face of the horizontal section 815 of the base member main body 810.

Three bolt inserting holes in which the rear lower panel 26 is bolted are also formed through the vertical section 842b of the second bracket 842.

The rear lower panel 26 has similar bolt inserting holes that correspond to the bolt inserting holes in the second bracket 842. With the bolt inserting holes in the lower panel 26 being aligned to the bolt inserting holes in the vertical section 842b, the bolts 861 are inserted through the bolt inserting holes (see FIG. 5). This structure fixes the bottom end of the lower panel 26 to the base member 8. Meanwhile, the top edge of the lower panel 26 is bolted to the midlevel wall 34. The lower panel 26 hence covers the rear of the engine 40 and the electric power generator 41.

The third bracket 843 is bolted or welded to the left edge of the base member main body 810. The third bracket 843 has a notch section 843a and a notch section 843b. The notch section 843a serves to provide a space through which the power supply connector 32 is disposed. The notch section 843b serves to provide a space into which the gas supply tap 33 is inserted. The third bracket 843 has near its top edge a plurality of bolt inserting holes (not shown) in which the left lower panel 28 is bolted and fixed to the base member 8. The lower panel 28 hence covers the left-hand side of the engine 40 and the electric power generator 41.

The fourth bracket 844 is bolted or welded to the right edge of the base member main body 810. Specifically, the right edges of the bottom plate section 811, the vertical wall sections 812 and 813, and the horizontal sections 814 and 815 of the base member main body 810 are disposed in contact with the left side face of the fourth bracket 844 and joined liquid-tightly so as to leave no gaps between these members. The fourth bracket 844 hence forms the right wall section of the leakage storage space S2. In other words, the leakage storage space S2 is a space (with an open top) formed between the vertical section 836 of the first support plate 831 and the fourth bracket 844 by the bottom plate section 811 and the vertical wall sections 812 and 813 of the base member main body 810. In other words, these members form a box-shaped portion with an open top so that the leakages falling dropwise from the engine 40 are recovered and stored in the box-shaped portion. The fourth bracket 844 has near its top edge a plurality of bolt inserting holes (not shown) in which the right lower panel 24 is bolted and fixed to the base member 8. The lower panel 24 hence covers the right-hand side of the engine 40 and the electric power generator 41.

In the present embodiment, in the base member 8, the bottom plate section 811 and the pair of vertical wall sections 812 and 813 of the base member main body 810, the vertical section 836 of the first support plate 831, and the fourth bracket 844 form a box-shaped portion with an open top so that the box-shaped portion can recover and store leakages from the engine 40 as described above. The first bracket 841 and the second bracket 842 are disposed outside the box-shaped portion (to the front and rear of the box-shaped portion respectively). The front lower panel 22 of the package 2 is fixed to the first bracket 841, and the rear lower panel 26 of the package 2 is fixed to the second bracket 842, so that the brackets 841 and 842 can be used to fix the lower panels 22 and 26. Therefore, even if the brackets 841 and 842 have bolt inserting holes to fix the panels 22 and 26, the bolt inserting holes are not open to the internal space of the box-shaped portion (leakage-storing space S2). Hence, the panels 22 and 26 are fixed to the base member 8 in such a manner that the leakages stored in the box-shaped portion do not leak out.

The present invention is by no means limited to the embodiment above. In the embodiment, the bottom plate section 811, the pair of vertical wall sections 812 and 813, the first support plate 831, and the fourth bracket 844 form a leakage storage space S2 (box-shaped portion). Alternatively, there may be provided another member to form a leakage storage space. For example, the bottom plate section 811, the pair of vertical wall sections 812 and 813, the first support plate 831, and the third support plate 833 may form a leakage storage space.

The present invention may be applied to a GHP (gas heat pump) that includes a compressor in a refrigerating circuit as a work machine powered by an engine.

The present invention is by no means limited to the embodiments described above and may be implemented in various other forms. Therefore, the embodiments are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

The invention claimed is:
1. An engine system containing an engine and a work machine in a single package, the engine system comprising:
    a base member being box-shaped defined by:
        two opposing vertical walls extending from a base plate each having a horizontal section contiguous with a top edge of each of said opposing vertical walls serving as a horizontal section for an engine mount of the engine, and
        two opposing fixing brackets for fixing external face panels;
    the box-shaped base member having an open top and an open space between the two opposing vertical walls and two opposing fixing brackets creating a U-shaped cross section between the two opposing vertical walls, the base member being provided below an oil pan for the engine.

* * * * *